(12) United States Patent
Wright et al.

(10) Patent No.: US 6,914,433 B2
(45) Date of Patent: Jul. 5, 2005

(54) DETECTION OF SUBSURFACE RESISTIVITY CONTRASTS WITH APPLICATION TO LOCATION OF FLUIDS

(75) Inventors: David A Wright, Edinburgh (GB); Antoni M Ziolkowski, Edinburgh (GB); Bruce A Hobbs, Peniculk (GB)

(73) Assignee: The University Court of the University of Edinburgh, Edinburgh (GB)

( * ) Notice: Subject to any disclaimer, the term of this patent is extended or adjusted under 35 U.S.C. 154(b) by 0 days.

(21) Appl. No.: 10/482,554

(22) PCT Filed: Sep. 9, 2002

(86) PCT No.: PCT/GB02/04121
§ 371 (c)(1),
(2), (4) Date: Jun. 17, 2004

(87) PCT Pub. No.: WO03/023452
PCT Pub. Date: Mar. 20, 2003

(65) Prior Publication Data
US 2004/0232917 A1 Nov. 25, 2004

(30) Foreign Application Priority Data
Sep. 7, 2001 (GB) .............................................. 0121719

(51) Int. Cl.⁷ .............................................. G01V 3/08
(52) U.S. Cl. ......................................... 324/336; 702/16
(58) Field of Search ................................ 324/334–340, 324/348, 357–366; 702/6–7, 16

(56) References Cited

U.S. PATENT DOCUMENTS

| 2,465,696 | A | * | 3/1949 | Paslay | .......................... | 367/23 |
|---|---|---|---|---|---|---|
| 4,417,210 | A | | 11/1983 | Rocroi et al. | | |
| 4,446,434 | A | | 5/1984 | Sternberg et al. | | |
| 5,467,018 | A | | 11/1995 | Ruter et al. | | |
| 5,563,513 | A | | 10/1996 | Tasci et al. | | |
| 5,796,253 | A | | 8/1998 | Bosnar et al. | | |
| 6,603,313 | B1 | | 8/2003 | Srnka | | |
| 6,628,119 | B1 | | 9/2003 | Eidoesmo et al. | | |
| 6,677,757 | B2 | | 1/2004 | Fine et al. | | |
| 6,720,771 | B2 | | 4/2004 | Gupta et al. | | |

FOREIGN PATENT DOCUMENTS

GB        2396563        9/2003

OTHER PUBLICATIONS

Groenenboom et al, Receiver Array Ground Penetrating Radar Imaging, Applied Geophysics, 2368–2370.
Strack, K–M, 1992, Exploration With Deep Transient Electromagnetocs: Elsevier, pp. 47–52, 154–156, 250–252 and 285–286.

* cited by examiner

*Primary Examiner*—Bot LeDynh
(74) *Attorney, Agent, or Firm*—Stephen H. Eland; Dann, Dorfman, Herrell and Skillman

(57) ABSTRACT

The invention relates to a method of mapping subsurface resistivity contrasts by making multichannel transient electromagnetic (MTEM) measurements on or near the earth's surface using at least one source, receiving means for measuring the system response and at least one receiver for measuring the resultant earth response. All signals from the or each source-receiver pair are processed to recover the corresponding electromagnetic impulse response of the earth and such impulse responses, or any transformation of such impulse responses, are displayed to create a subsurface representation of resistivity contrasts. The invention enables subsurface fluid deposits to be located and identified and the movement of such fluids to be monitored.

15 Claims, 10 Drawing Sheets

FIG. 1
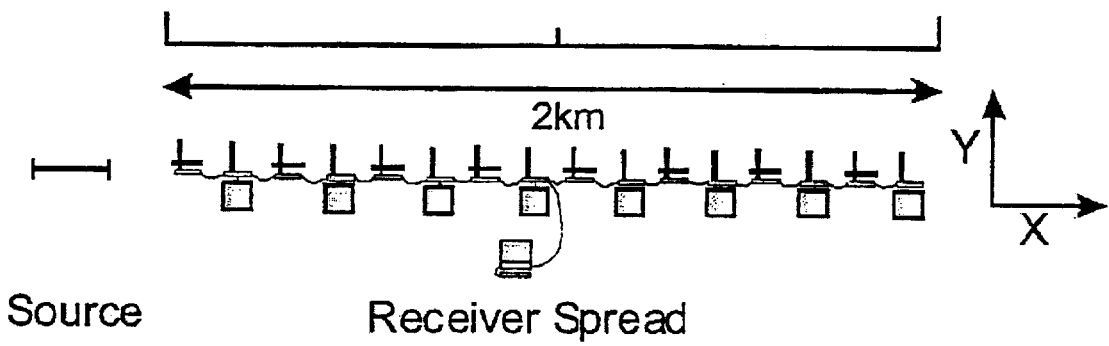
Source            Receiver Spread
FIG. 2a
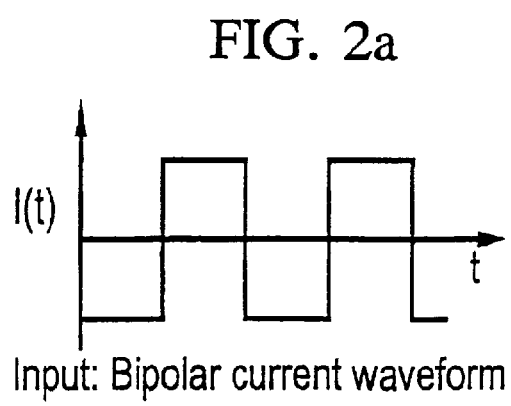
Input: Bipolar current waveform
FIG. 2b
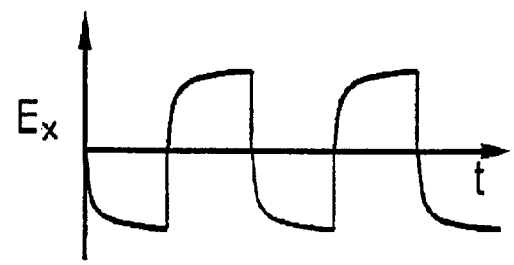
Output: Recorded transient response
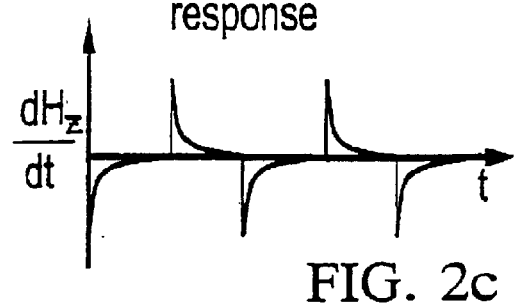
FIG. 2c

DETECTION OF SUBSURFACE RESISTIVITY CONTRASTS WITH APPLICATION TO LOCATION OF FLUIDS

TECHNICAL FIELD

This invention relates to a method of mapping subsurface resistivity contrasts. The method enables the detection and location of subsurface resistivity contrasts, which, in turn, enables the discrimination between, for example, water (brine or fresh water), which is conductive, and hydrocarbons (gas or oil), which are resistive.

Porous rocks are saturated with fluids. The fluids may be water (brine or fresh water), or hydrocarbons (gas or oil). The resistivity of rocks saturated with hydrocarbons is often orders of magnitude greater than the resistivity of rocks saturated with water (e.g. 1,000 $\Omega$ m for hydrocarbons vs. 1 $\Omega$ m for water). That is, hydrocarbons are resistive and water is conductive. If a potentially hydrocarbon-bearing subsurface geological structure has been discovered, for instance by seismic exploration, it is important to know, before drilling, whether it is resistive (hydrocarbons), or conductive (water). Electromagnetic methods have the potential to make this discrimination and thereby reduce the risk of drilling dry holes.

However, despite decades of research and development in this field, there is still no routine procedure for acquiring and processing electromagnetic data to make this distinction and to recover subsurface maps representing resistivity variations.

BACKGROUND ART

The known prior art can be summarised in the following papers which are discussed more fully below.
[1] McNeill, J. D., 1999, Principles and application of time domain electromagnetic techniques for resistivity sounding, Technical Note TN-27, Geonics Ltd.
[2] Zhdanov, M. S., and Keller, G. V., 1994, The geoelectrical methods in geophysical exploration: Elsevier
[3] Eaton, P. A., and Hohmann, G. W., 1989, A rapid inversion technique for transient electromagnetic soundings: Physics of the Earth and Planetary Interiors, 53, 384–404.
[4] Strack. K.-M, 1992, Exploration with deep transient electromagnetics: Elsevier
[5] Christensen, N. B., 2002, A generic 1-D imaging method for transient electromagnetic data: Geophysics, 67, 438–447.
[6] Strack, K.-M., 1985, Das Transient-Elektromagnetische Tiefensondierungsverfahren angewandt auf die Kohlenwasserstoff- und Geothermie-Exploration, in: Ebel, A., Neubauer, F. M., Raschke, E., and Speth, P., (Hrsg.), Mitteilungen aus dem Institut für Geophysik und Meteorologie der Universität zu Köln 42.
[7] Cheesman, S. J., Edwards, R. N., and Law, L. K., 1990, A test of a short-base-line seafloor transient electromagnetic system: Geophysical Journal International, 103, 2, 431–437.
[8] Cairns, G. W., Evans, R. L. & Edwards, R. N., 1996. A time domain electromagnetic survey of the TAG hydrothermal mound, Geophys. Res. Lett., 23, 3455–3458.
[9] Cheesman, S. J., Edwards, R. N., and Chave, A. D., 1987, On the theory of sea-floor conductivity mapping using transient electromagnetic systems: Geophysics, 52, 204–217.
[10] Yu, L., Evans, R. L., and Edwards, R. N., 1997, Transient electromagnetic responses in seafloor with triaxial anisotropy: Geophysical Journal International, 129, 300–306.
[11] Eidesmo, T., Ellingsrud, S., MacGregor, L. M., and Constable, S., Sinha, M. C., Johansen, S., Kong, F. N., and Westerdahl, H., 2002, Sea Bed Logging (SBL), a new method for remote and direct identification of hydrocarbon filled layers in deepwater areas: First Break, 20, 144–152.
[12] MacGregor, L. M., Constable, S., and Sinha, M. C., 1998, The RAMESSES experiment-III. Controlled-source electromagnetic sounding of the Reykjanes Ridge at 57 45N: Geophysical Journal International, 135, 773–789.
[13] MacGregor, L. M., Sinha, M. C., and Constable, S., 2001, Electrical resistivity structure of the Valu Fa Ridge, Lau basin, from marine controlled source electromagnetic sounding Geophys. J. Int., 146, 217–236.
[14] Ziolkowski, A., Hobbs, B. A., Andrieux, P., Rüter, H., Neubauer, F., and Hördt, A., 1998. Delineation and monitoring of reservoirs using seismic and electromagnetic methods: Project Number OG/0305/92/NL-UK, Final Technical Report to European Commission, May 1998.
[15] Wright, D. A., Ziolkowski, A, and Hobbs, B. A., 2001, Hydrocarbon detection with a multi-channel transient electromagnetic survey: Expanded Abstracts 71st SEG Meeting, 9–14 September, San Antonio, p 1435–1438.

Conventionally time domain electromagnetic investigations use a transmitter and a receiver, or a transmitter and a number of receivers. The transmitter may be a grounded dipole (electric source) or a wire loop or multi-loop (magnetic source) and the receiver or receivers may be grounded dipoles (electric receivers—recording potential differences or electric fields) or wire loops or multi-loops or magnetometers (magnetic receivers—recording magnetic fields and/or time derivatives of magnetic fields). The transmitted signal is usually formed by a step change in current in either an electric source or in a magnetic source.

Known prior developments include (1) a methodology frequently termed TDEM and often taken to imply a magnetic source and a magnetic receiver, (2) the Long Offset Time-Domain Electromagnetic Method (LOTEM) developed for land surveys, (3) time domain electromagnetics in the marine environment (university of Toronto/Scripps Institution of Oceanography), (4) Sea Bed Logging (SBL) using single frequency electromagnetic measurements in the marine environment (Scripps Institution/Southampton Oceanography Centre/Electromagnetic Geophysical Services Ltd.), and (5) our own previous work on multi-channel transient electromagnetic (MTEM) measurements made in collaboration with the University of Cologne, Deutsch Montan Technologie, and Compagnie Generale de Geophysique. These known developments are discussed more fully below.

(1) The TDEM method is exemplified by commercial equipment such as PROTEM from Geonics Ltd., SMARTem from ElectroMagnetic Imaging Technology Pty Ltd (EMIT), UTEM from the University of Toronto and PATEM, a pulled-array from the University of Aarhus. These systems use magnetic sources and magnetic receivers in central loop, coincident loop, offset loop, or borehole configurations and as a consequence delineate conductive rather than resistive targets. They measure voltage induced in the receiver coil at a number of times (referred to as gates) after the transmitter current has been switched off [1]. A decay curve is then formed which is modelled either directly or through the use of various apparent resistivity measures such as early time and late time apparent resistivity [2], or imaged using a rapid inversion scheme [3]. The modelling approach uses a small number of parameters and makes assumptions about the turn-off characteristics of the source, for example that it is a perfect step function or a perfect ramp. TDEM methods all fail to recognise the importance of measuring the system response and instead put much effort into generating a transient signal with as small a turn-off time or ramp turn-off time as possible. The systems and associated software do not determine the earth's response function as defined in the present invention.

(2) The LOTEM method (whose principal researchers are Vozoff, Strack and Hördt), and a similar system developed at the Colorado School of Mines, uses a large dimension electric source, typically 1–2 km long with electric and magnetic receivers placed several kilometer from the source. It is designed for land surveys. Decay curves measured by the receivers may be converted to various apparent resistivity curves. The decay or resistivity curves are modelled using a small number of parameters taken to represent sub-surface conditions beneath the receivers only. The collation of transformed curves from adjacent receivers forms an image representation.

The method includes consideration of a measurement of the system response. It is recommended ([4], p154) that this be performed either in the laboratory, or in the field at the beginning of the survey. LOTEM defines the system response as the response due to a delta-function input, which, it is admitted ([4], p49), cannot be achieved in practice. Instead, a square wave is input and the resulting output differentiated. In reality it is not possible to input an exact square wave either. Usually only one system response is obtained, determined as the average of a statistical representative number of transmitted pulses ([4], p68). An assumption is made that switching characteristics do not vary under load ([4], p155).

Most interpretation methods in the literature are based on a knowledge of the step response. This is impossible to obtain without a deconvolution of the measured data which is stated to be inherently unstable [5]. LOTEM recommends that either apparent resistivity curves are obtained after time-domain deconvolution using an iterative scheme [6] or that synthetic data from modelling is convolved with the system response before comparison with the measured data. A rule of thumb is that this should be done when the length of the system response is more than one third of the length of the transient ([4], p52).

The LOTEM method fails to recognise the importance of measuring the system response for each source transient in the field, and fails to recognise that the decay curves are a function of all the intervening material between the source and corresponding receiver where the induced currents flow.

(3) The University of Toronto sea-floor EM mapping systems (principal researchers: Edwards, Yu, Cox, Chave and Cheesman), consist of a number of configurations including a stationary electric receiver on the sea floor and a towed electric transmitter, and a magnetic source and several collinear magnetic receivers forming an array which is towed along the sea-floor. In early experiments, the system response was measured in free space and was convolved with the theoretical impulse response of a simple model of the sea-water and underlying earth in order to model the measured data [7]. In later experiments, for the case of an electric source, the measured current input to the transmitter is convolved with the impulse response of the receiver, again measured in free space, and then with the impulse response of a model to give a synthetic signal for comparison to that measured [8]. No receivers are placed near the transmitter to determine the system response under load.

The group have developed an extensive library of analytic solutions and recursive numerical schemes for the response of simple geological models to a step change source. The models invariably have a small number of parameters and interpretations of measured decay curves are based on this modelling approach [9], [10].

Their technique fails to recognise the importance of measuring the system response for each source transient and using this to deconvolve the measured transients to obtain the estimated earth impulse response functions.

(4) Sea Bed Logging (SBL) is a realisation of the CSEM (controlled source electromagnetic) method and has been developed by Electromagnetic Geoservices Ltd (EMGS), a subsidiary of Statoil, in conjunction with the University of Cambridge, University of Southampton, and Scripps Institution of Oceanography [11]. It comprises a number of autonomous two-component electric receivers in static positions on the sea floor and an electric source towed approximately 50 m above the sea floor. The receivers remain in their positions on the sea floor recording continuously until instructed to pop up for recovery at the sea surface at the end of the survey. The source (DASI—deep-towed active source instrument) is a 100 m long horizontal electric dipole [12]. Electrodes spaced along the source dipole are used to monitor the transmitted fields. These enable the receiver data to be normalised by the source dipole moment for comparison with modelling results [13]. Unlike the above transient systems, in the SBL technique the source transmits at only one frequency which the operators optimise to the target under investigation [11]. The method relies on the towed movable source creating data for several source-receiver separations and these data are interpreted by modelling. The method does not involve a transient source and takes no account of the system response.

(5) The University of Edinburgh, the University of Cologne, Deutsch Montan Technologie, and Compagnie Generale de Geophysique collaborated within the European Commission THERMIE Project OG/0305/92/NL-UK (which ran from 1992 to 1998) to obtain multi-channel transient electromagnetic (REM) data in 1994 and 1996 over a gas storage reservoir at St. Illiers la Ville in France. The experiment is described in detail in the Final Technical Report to the European Commission, entitled "Delineation and Monitoring of Oil Reservoirs using Seismic and Electromagnetic Methods" [14]. The project had two objectives: first, to develop a method to detect hydrocarbons directly; and second, to monitor the movement of hydrocarbons in a known reservoir. Neither of these objectives was achieved.

Ziolkowski et al. [14] and even Wright et al. [15] failed to recognise the importance of measuring the system response for each source transient.

DISCLOSURE OF THE INVENTION

The present invention seeks to provide a routine procedure for acquiring and processing electromagnetic data to enable the mapping of subsurface resistivity contrasts.

According to the present invention there is provided a method of mapping subsurface resistivity contrasts comprising making multichannel transient electromagnetic (MTEM) measurements using at least one source, receiving means for measuring system response and at least one receiver for measuring the resultant earth response, processing all signals from the or each source-receiver pair to recover the corresponding electromagnetic impulse response of the earth, and displaying such impulse responses, or any transformation of such impulse responses, to create a subsurface representation of resistivity contrasts. The locations of the resistivity contrasts can be determined from the source-receiver configuration, and electromagnetic propagation both above and below the receivers.

The method enables the detection and location of subsurface resistivity contrasts. For example, the method enables discrimination between water (brine or fresh water) which is conductive and hydrocarbons (gas or oil) which are resistive. The method also enables the movement of such fluids to be monitored. The method may also be used to find underground aquifers.

BRIEF DESCRIPTION OF DRAWINGS

Embodiments of the invention will now be described, by way of example only, with particular reference to the accompanying drawings, in which:

FIG. 1 is a typical layout showing locations of an electromagnetic source and electromagnetic receivers for performing a method according to the invention of mapping resistivity contrasts;

FIGS. 2a–c are schematic diagrams showing a source current waveform and resulting transient responses;

MODES FOR CARRYING OUT THE INVENTION

Figure 3:
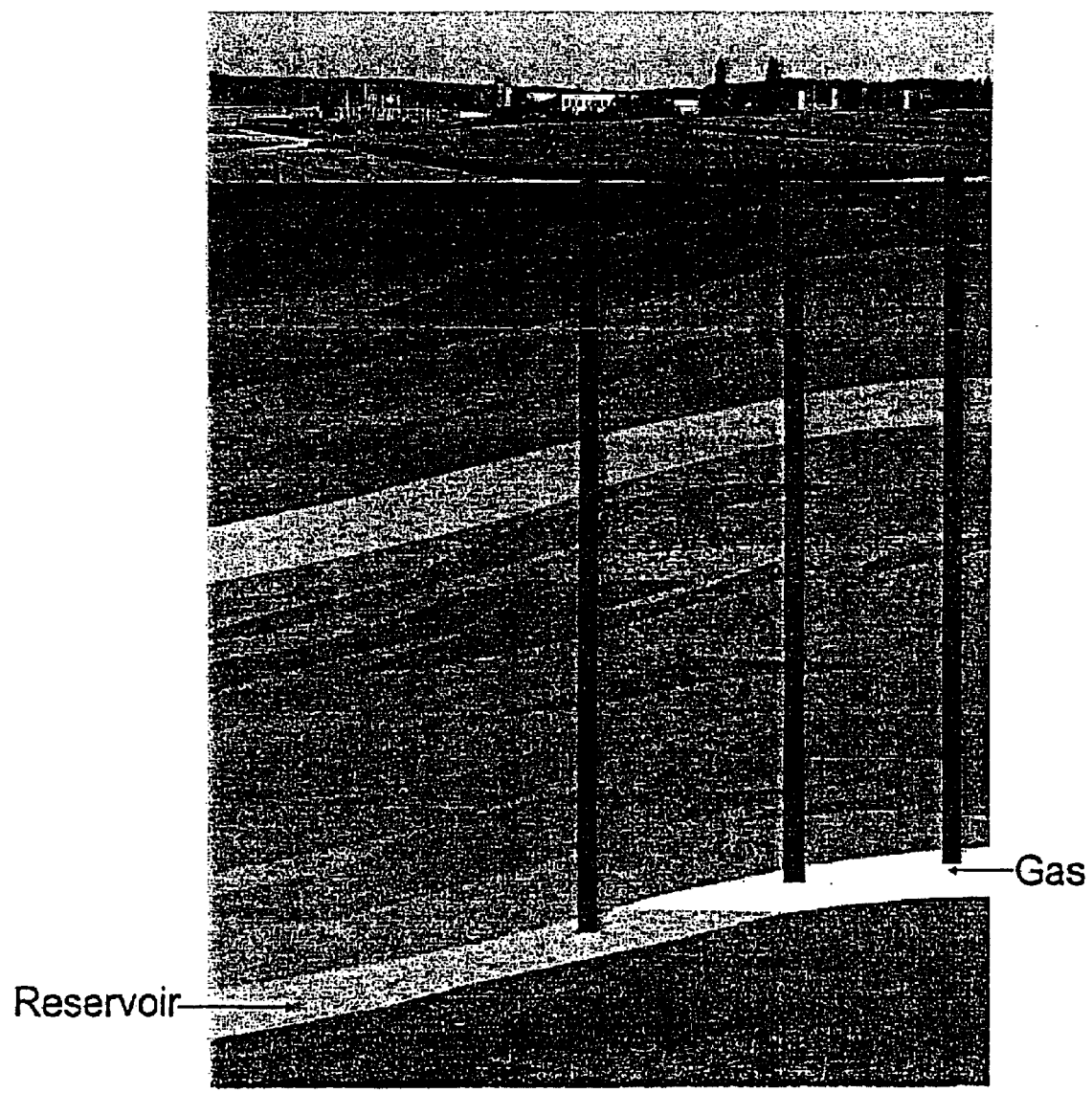
FIG. 3 is a schematic cross-section of the earth beneath St Illiers la Ville, France, and illustrating gas trapped above water in a porous sandstone anticline.

Multichannel Transient ElectroMagnetic (MTEM) data can be acquired in a number of different ways. By way of example only, there is described below elements of the data acquisition system, as used in the THERMIE project OG/0305/92/NL-UK, and as described in [14] above. FIG. 1 shows a typical configuration of a source and a line of receivers. The source is a current in a wire grounded at each end; in this case the two ends are 250 m apart. The receivers are represented as boxes in FIG. 1, each with two channels, and are spread out over a line 2 km long, which, in this case, is in line with the source. The receivers measure two kinds of electromagnetic response: potential differences, and the rate of change of the magnetic field. Potential differences are measured between two grounded electrodes, typically 125 m apart, while the rate of change of the magnetic field is measured with loops of wire, typically 50 m by 50 m square loops with many turns. FIG. 1 shows thirty-two receivers: sixteen in-line potential difference receivers, eight cross-line potential difference receivers, and eight loops measuring the rate of change of the magnetic field. The loops alternate down the line with the cross-line receivers. (This configuration was the result of constraints imposed by the limited number of two-channel recording boxes and the distance over which signals could be transmitted from these units to the data storage disk on the computer.) The source can be positioned outside or within the receiver spread and, in practice, the source or the receiver spread, or both, can be moved, depending on the application. The recorded transient responses from the receivers are suitably downloaded to the hard disk, or other storage medium, of a computer.

Choosing x as the in-line coordinate, y as the cross-line coordinate, and z as the vertical coordinate a notation for the measurements is developed. A receiver position can be denoted $x_r=(x_r,y_r,z_r)$, and a source position can be denoted $x_s=(x_s,y_s,z_s)$.

FIG. 2 shows schematically the relationship between the current input (shown here as an instantaneous change in polarity) and the expected response. $E_x$ is the potential difference in the in-line or x-direction, and $$\frac{\partial H_z}{\partial t}$$

is the rate of change of the vertical component of the magnetic field, measured with a horizontal loop. From FIG. 2 it can be seen that these responses vary with time after the current polarity is reversed at the source. In practice each of these quantities varies with the source position and the receiver position.

The key to the solution of the problem is the recovery of the impulse response of the earth. The configuration consists of an electromagnetic source, for instance a current dipole or a magnetic dipole at a location $x_s$, and a receiver, for instance two potential electrodes or a magnetic loop at a location $x_r$. The measurement of the response can be described as $$a_k(x_s,x_r,t)=s_k(x_s,x_r,t)*g(x_s,x_r,t)+n_k(x_r,t) \quad (1)$$

and it may be repeated many times. In this equation the asterisk * denotes convolution, and the subscript k indicates that this is the kth measurement in a suite of measurements for a given source-receiver pair, $s_k(x_s,x_r,t)$ is known as the system response and may in principle be different for each measurement; $g(x_s,x_r,t)$ is the impulse response of the earth and is fixed for any source-receiver pair, and $n_k(x_r,t)$ is uncorrelated electromagnetic noise at the receiver and varies from measurement to measurement. This equation must be solved for the impulse response of the earth $g(x_s,x_r,t)$. To do this, the system response $s_k(x_s,x_r,t)$ must be known.

In the acquisition and processing of the data to recover the impulse response of the earth, there are three critical steps which are formulated here for the first time. These are:
1. measurement of the system response for each source-receiver pair and in principle for each transient;
2. deconvolution of the measured signal for the measured system response to recover an estimated impulse response of the earth for each source-receiver pair and in principle for each transient; and 3. stacking of these estimated impulse responses to improve the signal-to-noise ratio and obtain an improved estimate of the earth impulse response for each source-receiver pair.

These steps are now described.

1. Measurement of the System Response

The system response $s_k(x_s,x_r,t)$ should be determined by measurement in the field. This depends on the source position $x_s$ and the position $x_r$ of the receiver and may also depend on the number k of the transient in the sequence, particularly if there are synchronisation problems. There are several ways in which the system response can be measured. In the case of the current dipole source shown in FIG. 1, the measurement of the system response for the electric field could be made with two electrodes placed very close (of the order of a few cm) to the source, with the known distance between them very small (of the order of a few cm), to avoid generating voltages that are too large. For the magnetic field system response, a small horizontal loop could be placed close (of the order of a few cm) to the source. Another possibility is to measure the input current directly. The recording system used to measure the system response should, preferably, have the same characteristics as the system used to record the measurement $a_k(x_s,x_r,t)$ described by equation (1) and, if the recording is digital, it should be unaliased. If the recording systems are not identical, the transfer function between the two must be known, so that differences can be eliminated. This is seen as follows.

The recording instrument used to measure the system response at the source has an impulse response $r(x_s,t)$, which must be known, while the recording instrument used to make the measurement $a_k(x_s,x_r,t)$ at the receiver has a response $r(x_r,t)$, which must also be known. Then the response $r(x_r,t)$ can be related to the response $r(x_s,t)$ by the equation, $$r(x_r,t)=r(x_s,t)*f(x_s,x_r,t), \quad (2)$$

in which the asterisk * represents convolution, and $f(x_s,x_r,t)$ is the Fourier transform of the transfer function relating the two responses. If the time function of the input signal at the source is $h_k(x_s,t)$, then the system response required to solve equation (1) is $$s_k(x_s,x_r,t)=h_k(x_s,t)*r(x_r,t). \quad (3)$$

The system response measured with the receiving means and recording system at the source will be $$s_k(x_s,x_s,t)=h_k(x_s,t)*r(x_s,t). \quad (4)$$

The system response required to solve equation (1) is obtained from equations (2), (3) and (4) as $$s_k(x_s,x_r,t)=s_k(x_s,x_s,t)*f(x_s,x_r,t). \quad (5)$$

2. Deconvolution

The earth impulse response $g(x_s,x_r,t)$ can be estimated, with noise, from equation (1) by deconvolution, given the known impulse response $s_k(x_s,x_r,t)$. That is, an estimate $\hat{g}_k(x_s,x_r,t)$ of the earth impulse response is obtained by deconvolution of equation (1). For example, $\hat{g}_k(x_s,x_r,t)$ may be obtained as the least-squares Wiener filter that, when convolved with the known function $s_k(x_s,x_r,t)$, gives the known function $a_k(x_s,x_r,t)$. Any uncertainties in the time origin of the response are resolved automatically by this deconvolution step, provided the system response $s_k(x_s,x_r,t)$ and the measurement $a_k(x_s,x_r,t)$ are properly synchronised.

Synchronisation is important because the time parameter t has the same origin in all the four functions ($a_k(x_s,x_r,t)$, $s_k(x_s,x_r,t)$, $g(x_s,x_r,t)$, and $n_k(x_r,t)$) of equation (1).

3. Stacking

To improve the signal-to-noise ratio, using a suite of measurements in which k varies from 1 to n, say, a better estimate of $g(x_s, x_r, t)$ may be made by stacking. That is, the improved estimate is $$\bar{g}(x_s, x_r, t) = \frac{1}{n}\sum_{k=1}^{n} \hat{g}_k(x_s, x_r, t). \quad (6)$$

Subsequent processing of the estimated impulse responses $\bar{g}(x_s,x_r,t)$ and display of the results for different source-receiver pairs can use many of the methods commonly used for seismic exploration data.

If the system response $s_k(x_s,x_r,t)$ is identical for all n measurements made for the given source-receiver pair, the stacking can be done first and the deconvolution afterwards.

The impulse response of the earth $g(x_s,x_r,t)$ is typically only a few milliseconds, or tens of milliseconds, in duration. Therefore, in principle, thousands of repeat measurements of the response may be made in a few minutes.

The invention is illustrated in the following non-limitative example.

Figure 4:
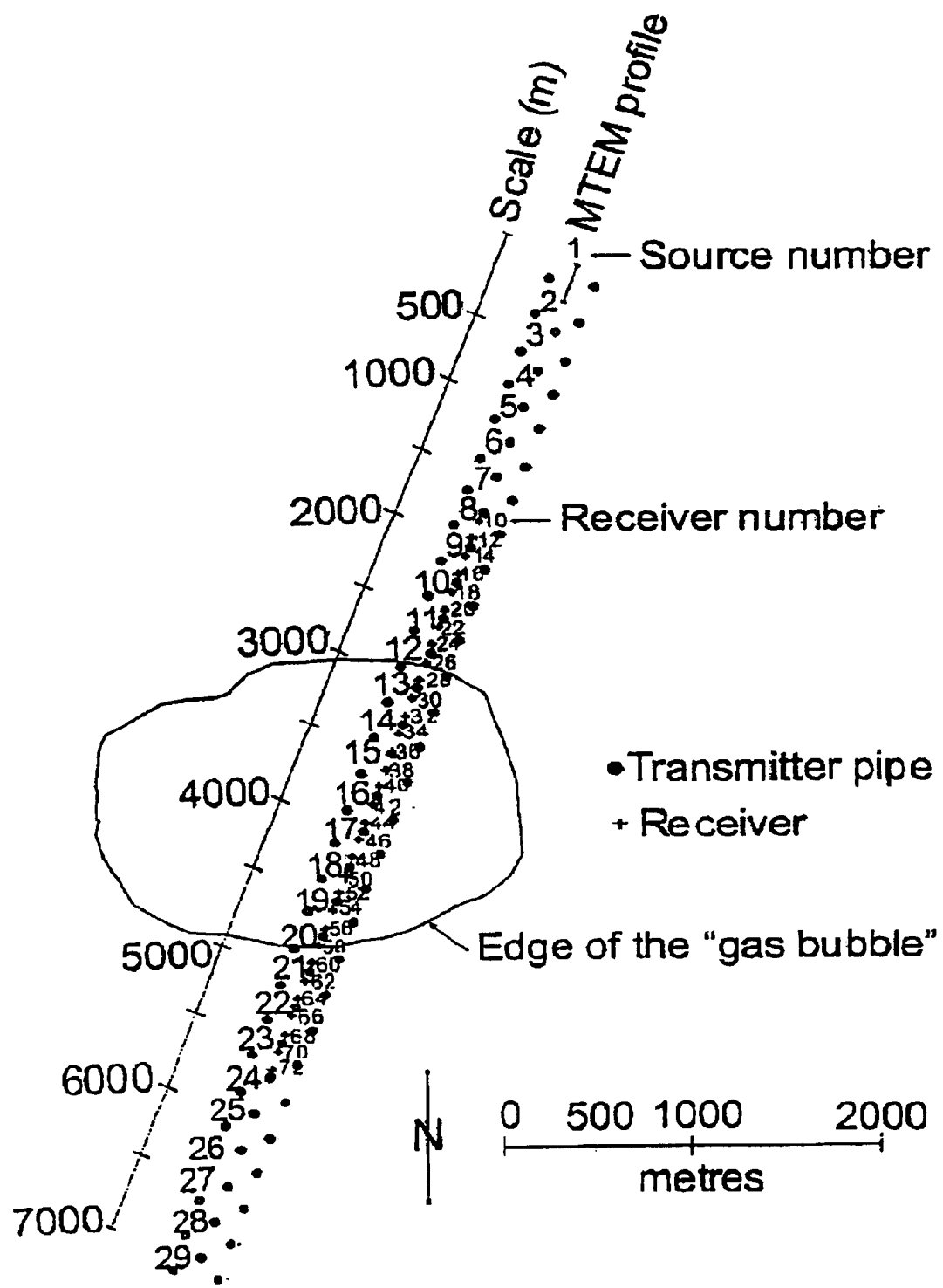
FIG. 4 is a schematic plan of a typical arrangement of sources and receivers of a multichannel transient electromagnetic measurement system over a subsurface volume of gas used for performing a method according to the present invention.

Within the European Commission THERMIE Project OG/0305/92/NL-UK [14], MTEM data sets were obtained in 1994 and 1996 over a gas storage reservoir at St. Illiers la Ville in France. FIG. 3 shows a schematic section through the underground gas storage reservoir and shows the reservoir and monitoring wells. FIG. 4 shows a plan of the MTEM profile in relation to the edge of the underground "gas bubble". The equipment that was used to record the responses $a_k(x_s,x_r,t)$ consisted of sixteen two-channel TEAMEX boxes manufactured by Deutsch Montan Technologie. At the time the data were acquired it was not recognised that it was necessary to record the system response for each source-receiver pair. In fact, with this equipment, it would have been impossible to measure the system response properly, because the low-pass filters were insufficient to prevent aliasing of the data at the 1 ms sample interval used in recording.

Figure 5:
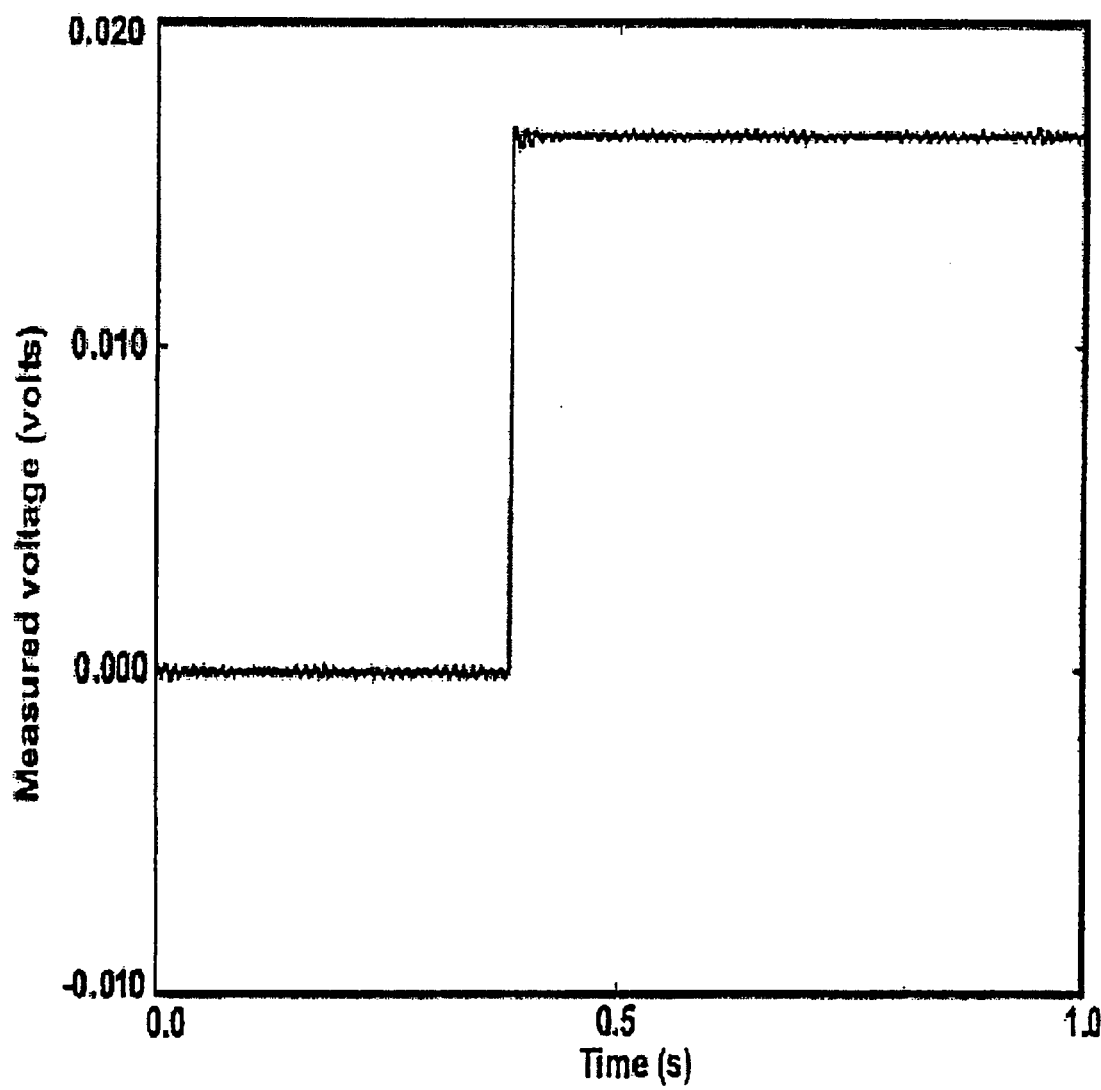
FIG. 5 shows the electric potential difference between two electrodes a few cm apart and a few cm from a 250 m long current dipole source.
Figure 6:
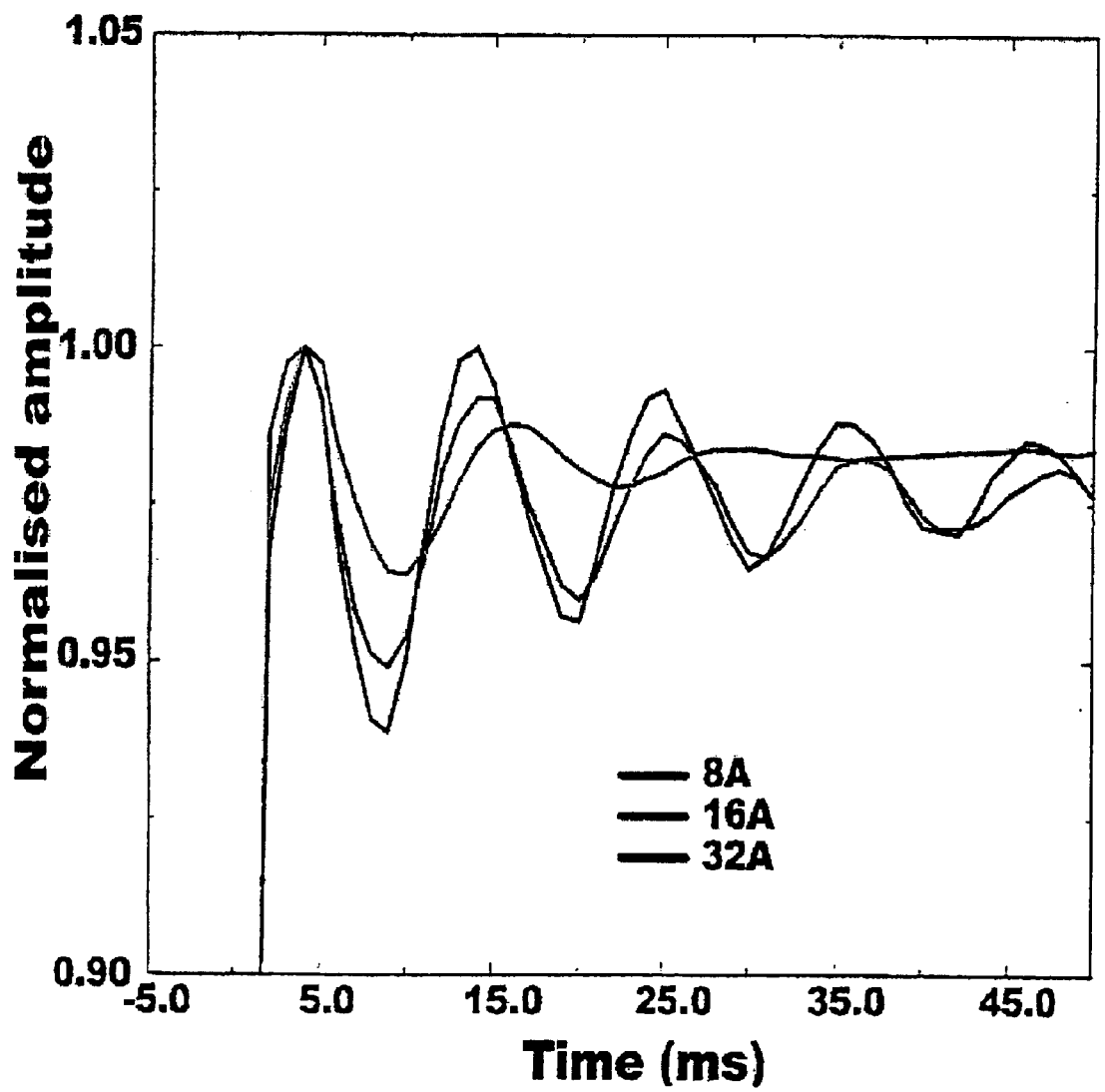
FIG. 6 shows normalised system responses for 8 A, 16 A and 32 A source currents showing the non-linearity of the system response with current.

The source input to the ground was essentially a change in polarity of a current of approximately 30 amperes, produced by a generator and Zonge transmitter in a wire 250 m long, grounded at each end. In fact, the source time function was not a perfect step, and there were small oscillations that could be seen on the few aliased measurements of the system response that were made in 1996. One of these can be seen in FIG. 5. It was noticed that the system oscillations varied with the current level, which varied with the source position. FIG. 6 shows a magnification of the measured system response for three different current levels, normalised to the maximum value. It can be seen that the oscillations differ with current level. In other words, with hindsight, we see that the system response was, in principle, different for every source-receiver pair, and ought to have been measured. In fact, we could not have made this measurement with the available equipment.

Figure 7:
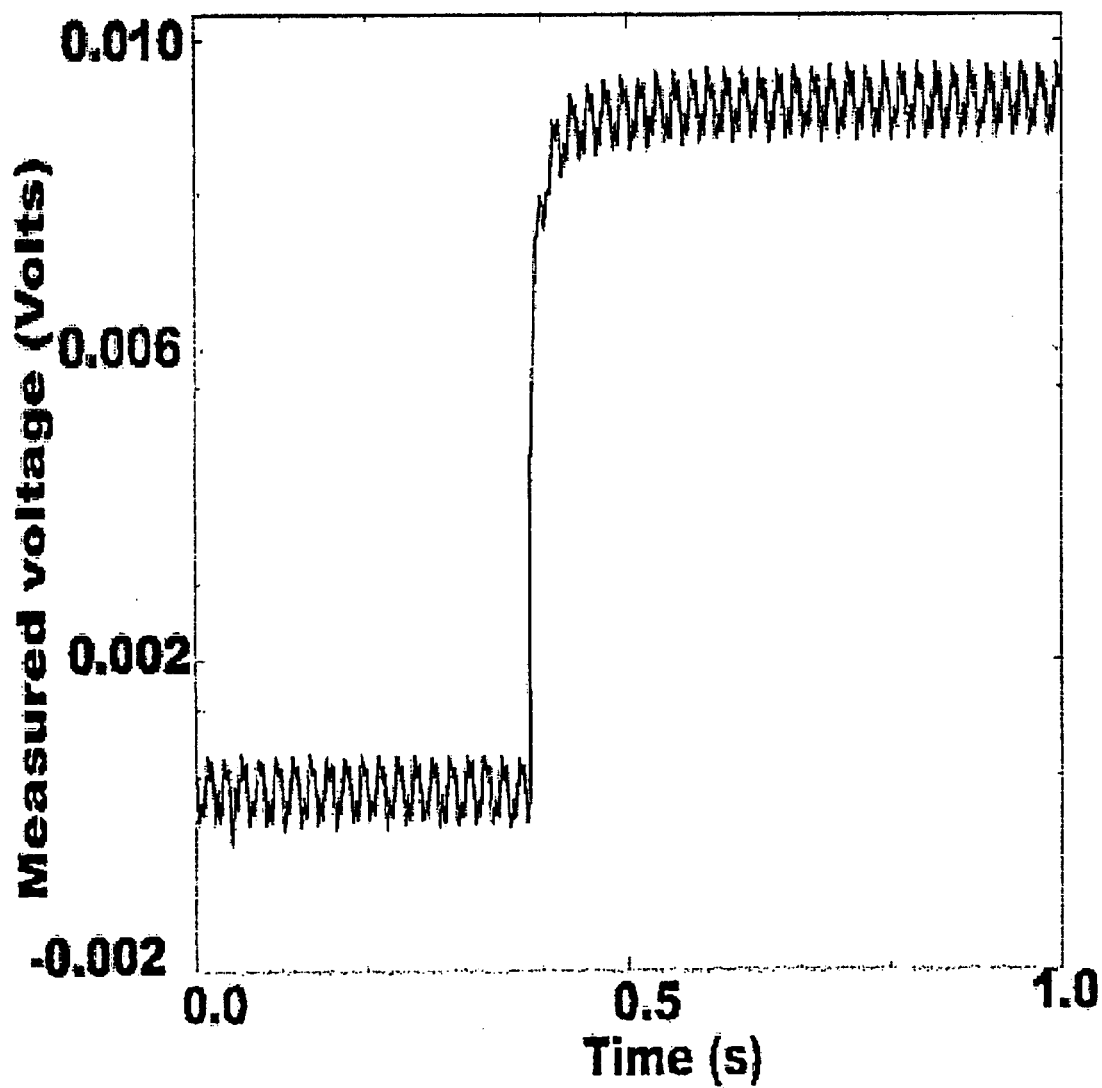
FIG. 7 is a typical in-line gradient of the electric potential response to a step in current at the source.

A typical measurement $a_k(x_s,x_r,t)$ is shown in FIG. 7.

The deconvolution step 2 is impossible to apply to these data because the system response for each source-receiver pair was not measured (step 1). To create an approximate estimate of the impulse response function we argue that the response $a_k(x_s,x_r,t)$ is approximately the response to a step:

$$a_k(x_s,x_r,t) \approx H(t)*g(x_s,x_r,t), \quad (7)$$

in which H(t) is the Heaviside, or step function. This approximation ignores the oscillations observed in the system responses shown in FIG. 6. Differentiating both sides of equation (7) yields $$\frac{\partial a_k(x_s, x_r, t)}{\partial t} \approx \frac{\partial H(t)}{\partial t} * g(x_s, x_r, t) \quad (8)$$
$$\approx \delta(t) * g(x_s, x_r, t)$$
$$\approx g(x_s, x_r, t).$$

Figure 8:
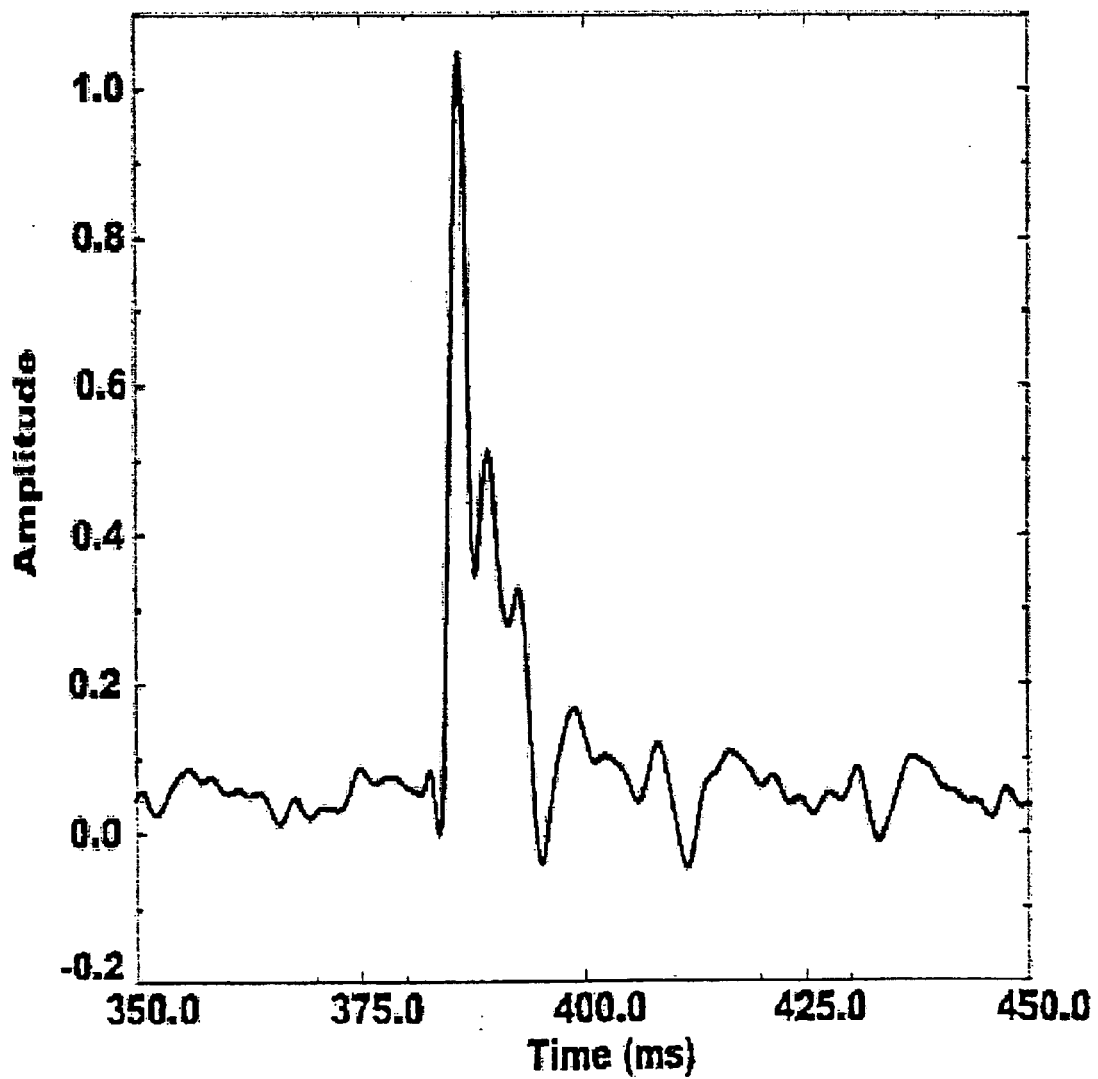
FIG. 8 shows a single approximate earth impulse response for a source-receiver separation of 1 km.

That is, the derivative of the measured response is approximately equal to the impulse response of the earth. These estimated impulse responses had synchronisation errors of the order of ±3 ms. These errors were a fault of the data acquisition system, but would have been eliminated if we had been able to measure the system response, as noted above. In fact, the timing errors can be estimated because the estimated impulse response has a very sharp peak at the beginning, which should arrive at the same time for all responses for the same source-receiver pair. FIG. 8 shows an estimate of the earth impulse response $\bar{g}(x_s,x_r,t)$, after stacking the time-corrected earth impulse responses for one source-receiver pair.

Figure 9:
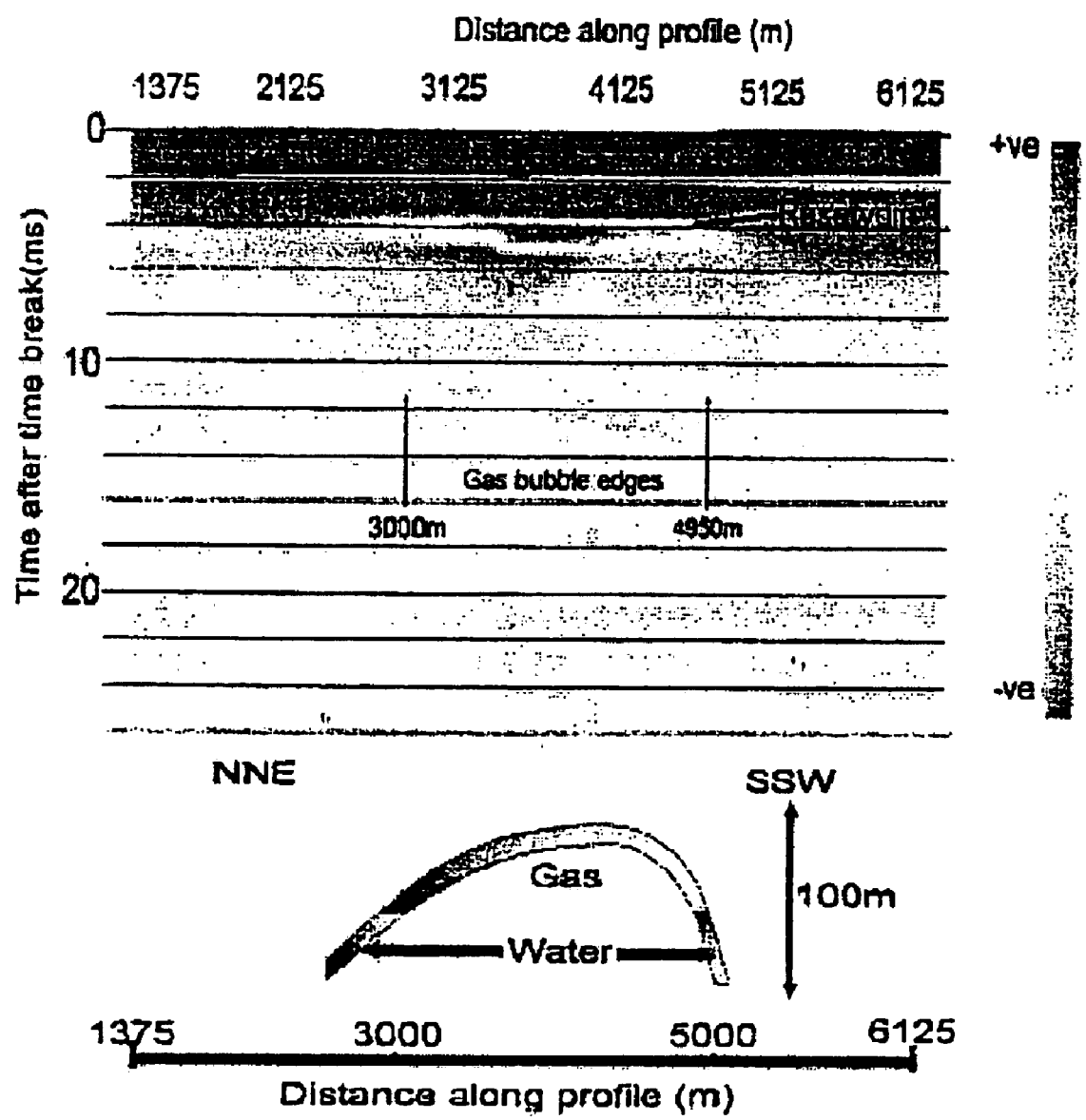
FIG. 9 shows a 1 km common-offset section of the derivative of the approximate earth response for data relating to measurements at the site shown in FIG. 3 taken in 1994.
Figure 10:
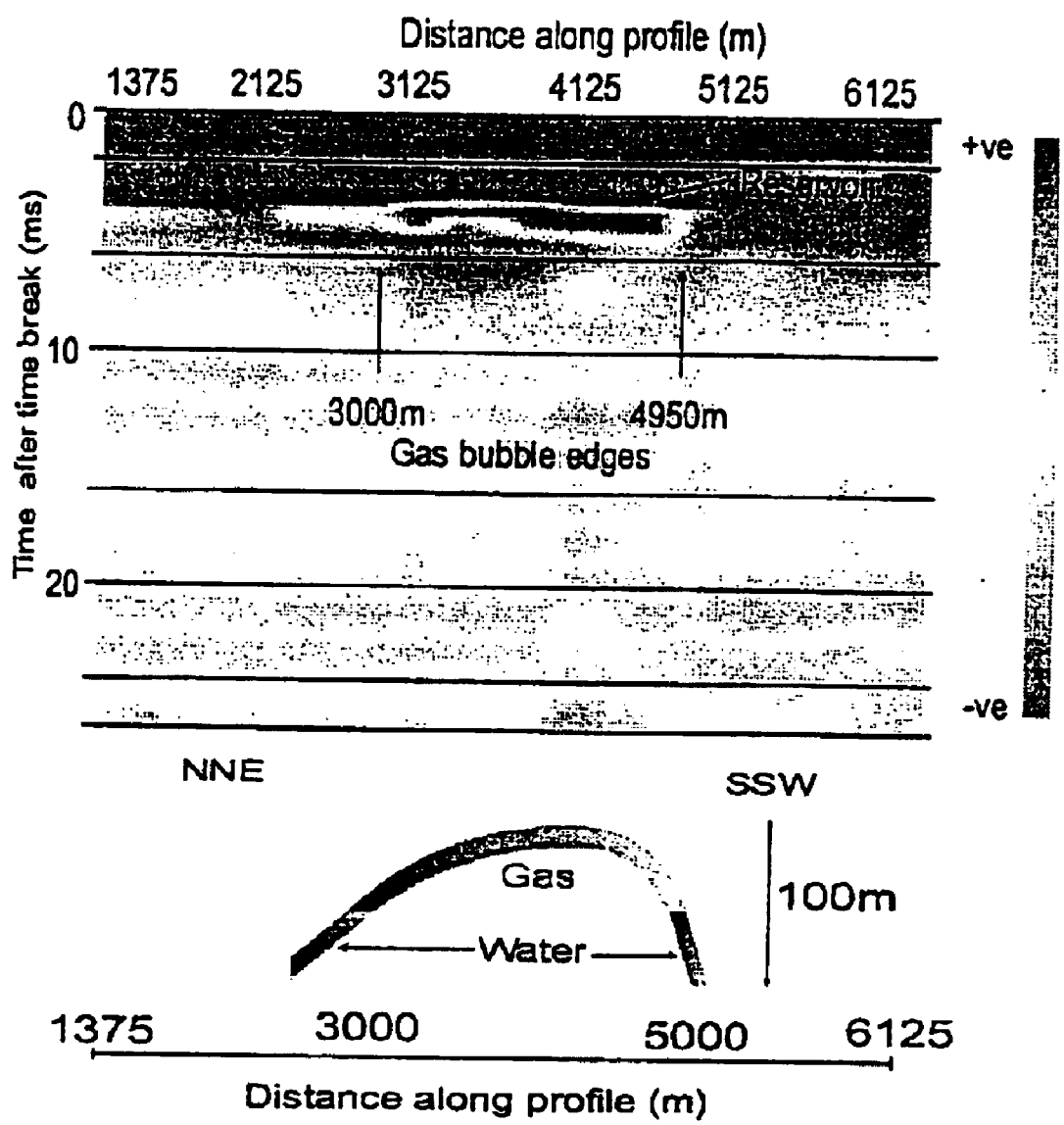
FIG. 10 shows a 1 km common-offset section of the derivative of the approximate earth response for data relating to measurements at the site shown in FIG. 3 taken in 1996.
Figure 11:
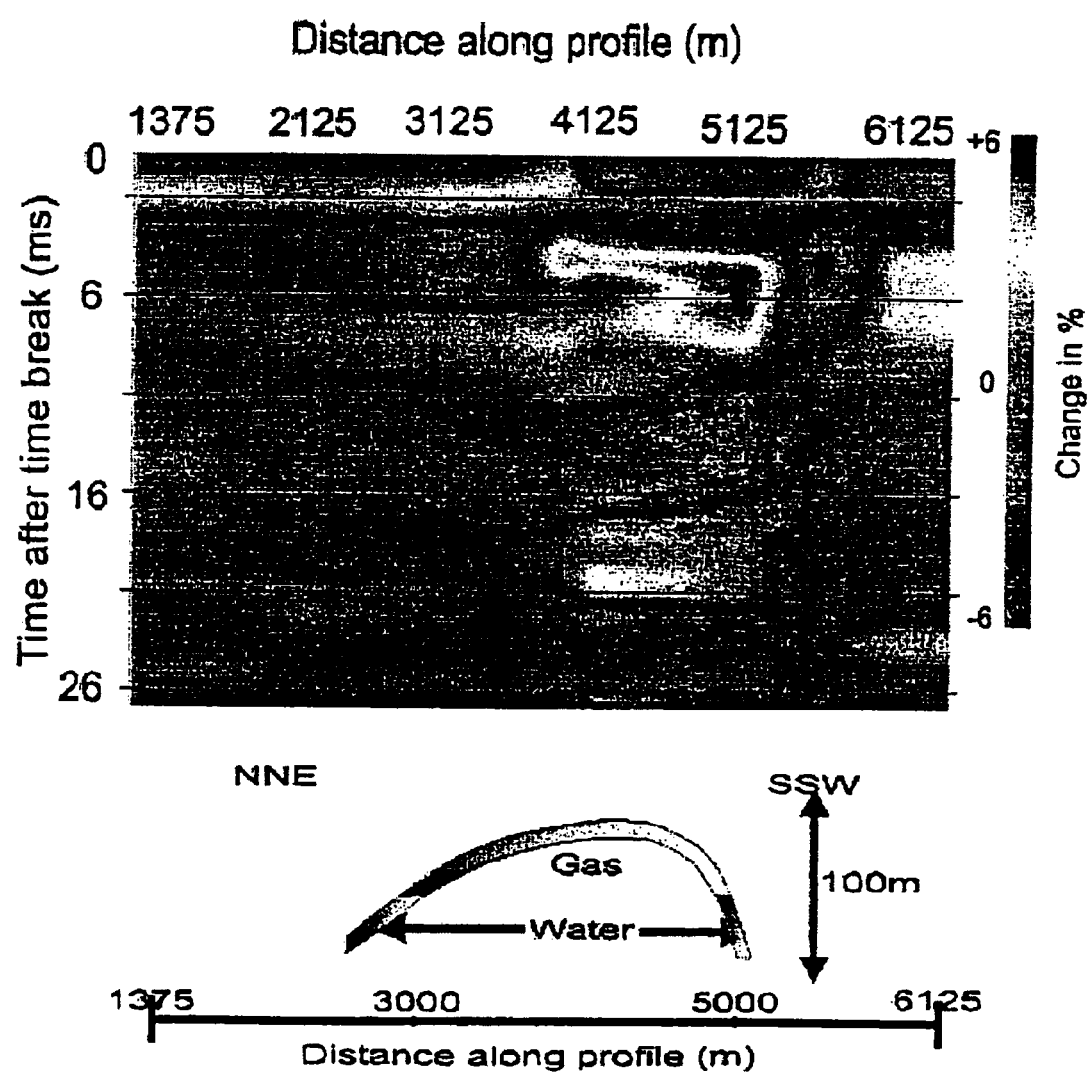
FIG. 11 shows a common-offset section of the 1996 earth impulse responses subtracted from the 1994 earth impulse responses, with 1 km offset.

FIG. 9 shows a common-offset section of the time derivative of estimated earth impulse responses for the 1994 data, in which the source-receiver distance is fixed, the horizontal scale is the position of the mid-point between source and receiver, and the vertical scale is time. The effect of the increased resistivity over the gas-filled reservoir can clearly be seen. FIG. 10 shows the corresponding section for the 1996 data. Again, the effect of the resistive gas-filled reservoir can clearly be seen. There was a slight movement of the gas-water content between October 1994, when the reservoir was full, and August 1996, when it was less full. Subtracting the 1996 earth impulse responses from the 1994 earth impulse responses yields the difference in response, and shows how the rock resistivity is changed by the change in fluid content. FIG. 11 shows a common-offset section of these differences, and clearly shows that there was more gas in the steeply-dipping southern part of the reservoir in 1994.

With this approximate analysis we have shown that it is possible (1) to detect and locate the presence of hydrocarbons with the MTEM method, and (2) to monitor the movement of the fluids in the reservoir. Given all the approximations that were made to obtain this result, it is clear that much better results would be obtained using the method of data acquisition and processing of the present invention.

The data should preferably be digitally recorded and processed in a computer either in real time or subsequently to create a subsurface representation of resistivity contrasts.

The MTEM measurements are made on or near the earth's surface which includes the sea floor. In the case of measurements at or near the sea floor, measurements may be made in the sea close to the actual seabed in view of the conductive nature of the seawater.

It will be appreciated from the above description that a key to the invention is the measurement and deconvolution of the system response $s_k(x_s,x_r,t)$, including source-receiver synchronisation, for every measured transient response $a_k(x_s,x_r,t)$, as defined in equation (1). This includes any approximation to this, such as is described above with reference to previously obtained data, in which there was an approximation of the deconvolution by differentiation of $a_k(x_s,x_r,t)$, the synchronisation errors found being subsequently corrected.

The invention also relates to apparatus for mapping subsurface resistivity contrasts and to a system for mapping subsurface resistivity contrasts.

INDUSTRIAL APPLICABILITY

The invention finds application in locating and identifying underground deposits of fluids, such as hydrocarbons and water.

What is claimed is:

1. A method of mapping subsurface resistivity contrasts or representations of resistivity contrasts comprising making multichannel transient electromagnetic (MTEM) measurements using at least one source, at least one measuring device for determining the system response and at least one receiver for measuring the resultant earth response, so that system response signals may be determined each time the earth response signals are measured by the at least one receiver, processing the earth response signal from the or each source-receiver pair and the or each corresponding system response signal to recover the or each corresponding electromagnetic impulse response of the earth, and displaying such impulse responses, or any transformation of such impulse responses, to create a subsurface representation of resistivity contrasts.

2. A method according to claim 1, wherein the impulse response of the earth is obtained from the equation $$a_k(x_s,x_r,t)=s_k(x_s,x_r,t)*g(x_s,x_r,t)+n_k(x_r,t)$$

where k indicates the kth measurement in a suite of measurements for a given source-receiver pair, $a_k(x_s,x_r,t)$ is the measured transient response for a given source-receiver pair of said MTEM measurements, * denotes convolution, $s_k(x_s,x_r,t)$ is the system response, $g(x_s,x_r,t)$ is the impulse response of the earth for a given source-receiver pair, and $n_k(x_r,t)$ is uncorrelated electromagnetic noise at the receiver.

3. A method according to claim 2, wherein said source comprises a current dipole and said receiving means measures the system response for the electric field and comprises two closely spaced apart, for example of the order of centimeters, electrodes positioned close to, for example of the order of centimeters from, the source.

4. A method according to claim 2, wherein said source comprises a current dipole and said receiving means measures the system response for the magnetic field and comprises a horizontal loop positioned close to, for example of the order of a few centimeters from, the source.

5. A method according to claim 2, wherein said source comprises at least one current loop and said receiving means comprises measuring means, for example a current meter, for measuring the current in the at least one current loop.

6. A method according to claim 2, wherein the recording system used to measure the system response has the same characteristics as the system used to record the measurement $a_k(x_s,x_r,t)$.

7. A method according to claim 2, wherein the recording system used to measure the system response has different characteristics from the recording system used to record the measurement $a_k(x_s,x_r,t)$ and wherein these differences are eliminated using the transfer function between the two recording systems.

8. A method according to claim 2, wherein an estimate of the earth impulse response with noise is obtained by deconvolution of the said equation.

9. A method according to claim 8, wherein said estimate of the earth impulse response is improved by stacking the estimated impulse responses.

10. A method according to claim 2, wherein the measured system response and corresponding measured transient are synchronised.

11. A method according to claim 2, wherein any different time origin between the measured system response and corresponding measured transient is measured and compensated for.

12. A method according to claim 1, wherein the MTEM measurements are made on the earth's surface.

13. A method according to claim 1, wherein the MTEM measurements are made at or near a sea floor of the earth's surface.

14. Apparatus for mapping subsurface resistivity contrasts comprising means for making multichannel transient electromagnetic (MTEM) measurements comprising at least one source, receiving means for measuring system response and at least one receiver for measuring the resultant earth response, processing means for processing all signals from the or each source-receiver pair to recover the corresponding electromagnetic impulse response of the earth, and display means for displaying such impulse responses, or any transformation of such impulse responses, to create a subsurface representation of resistivity contrasts.

15. A method according to claim 1 in which the system response is approximated by a step function and therefore the earth impulse response function is determined approximately from the measured earth response signal by differentiation.

* * * * *